United States Patent
Birru (10) Patent No.: US 8,941,322 B2
(45) Date of Patent: Jan. 27, 2015

(54) ADAPTIVE INTEGRATED DAYLIGHT AND ELECTRIC LIGHT CONTROL WITH MULTI-SENSOR FOR CONTROLLED-LIGHT DISTRIBUTION

(75) Inventor: Dagnachew Birru, Yorktown Heights, NY (US)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

(21) Appl. No.: 14/009,612

(22) PCT Filed: Apr. 4, 2012

(86) PCT No.: PCT/IB2012/051649
§ 371 (c)(1),
(2), (4) Date: Oct. 3, 2013

(87) PCT Pub. No.: WO2012/140545
PCT Pub. Date: Oct. 18, 2012

(65) Prior Publication Data
US 2014/0021866 A1    Jan. 23, 2014

Related U.S. Application Data

(60) Provisional application No. 61/474,763, filed on Apr. 13, 2011.

(51) Int. Cl.
*H05B 37/02* (2006.01)

(52) U.S. Cl.
CPC ............ *H05B 37/02* (2013.01); *H05B 37/0218* (2013.01); *Y02B 20/46* (2013.01)
USPC .......................................... 315/291; 315/312

(58) Field of Classification Search
USPC ....................... 315/209 R, 291, 307, 308, 312
See application file for complete search history.

(56) References Cited

U.S. PATENT DOCUMENTS

| 5,237,168 A | 8/1993 | Giust |
| 5,237,169 A | 8/1993 | Grehant |

(Continued)

FOREIGN PATENT DOCUMENTS

WO    WO2011033444 A1    3/2011

OTHER PUBLICATIONS

Brooks N S H ED et al., "Multi-Variable Optimisation within an Art Gallery Lighting Controller", Circuits and Systems, 1990., Proceedings of the 33rd Midwest Symposium on Calgary, Alta., Canada Aug. 12-14, 1990, New York, NY, USA,IEEE, US, Aug. 12, 1990, pp. 677-680, XP010047928.

(Continued)

*Primary Examiner* — Jimmy Vu
(74) *Attorney, Agent, or Firm* — Meenakshy Chakravorty (57) ABSTRACT

A system and a method for controlling light distribution in a space including multiple installed light sources (111, 112, 221-223) and an external light source (103, 203). The method includes measuring the luminance levels of light from the multiple installed light sources (111, 112, 221-223) and the external light source (103, 203) at a plurality of measuring areas within the space, controlling the intensity level of each of the installed light sources (111, 112, 221-223) and the amount of light from the external light source entering the space (103, 203) based on the measured luminance levels, and tuning the intensity level of each of the installed light sources (111, 112, 221-223) and the amount of external light entering the space (103, 203) to optimize the conditions such that the mean-squared error between the measured luminance levels and pre-defined target luminance levels for the respective plurality of measuring areas is minimized, and the amount of energy consumed by the multiple installed light sources (111, 112, 221-223) is minimized.

11 Claims, 7 Drawing Sheets

(56) References Cited

U.S. PATENT DOCUMENTS

| | | | |
|---|---|---|---|
| 6,064,949 | A | 5/2000 | Werner |
| 6,084,231 | A | 7/2000 | Popat |
| 7,111,952 | B2 | 9/2006 | Veskovic |
| 7,566,137 | B2 | 7/2009 | Veskovic |
| 2009/0301672 | A1 | 12/2009 | Veskovic |
| 2011/0029136 | A1 | 2/2011 | Altonen |
| 2011/0175553 | A1* | 7/2011 | Sampsell ............ 315/312 |

OTHER PUBLICATIONS

"Application Guide for Daylight Responsive Lighting Control", IEA, Daylight Buildings, International Energy Agency, Task 21, Subtask B, Feb. 2001.

* cited by examiner

ADAPTIVE INTEGRATED DAYLIGHT AND ELECTRIC LIGHT CONTROL WITH MULTI-SENSOR FOR CONTROLLED-LIGHT DISTRIBUTION

This invention relates to lighting controls and, more particularly, to a method and a system for controlling light distribution in a space including multiple installed light sources and an external light source.

Current building control systems for controlling electric light and daylight mostly use independent control systems. Integrated control of daylight and electric light appears to the next step of modern lighting control strategies. Recently, 'integrated' control systems have been disclosed in some U.S. patents. The following are two examples.

U.S. Pat. No. 7,111,952 B2 discloses a combined controller for window treatments and electric lights. This system includes daylight sensing to control the dimming levels of the electric lights and the amount of daylight in the room. This system uses a central controller to control the subsystems. However, the operation is sequential, i.e., first window treatments are adjusted until fully open/closed, and then electric lights are adjusted to provide the remaining required light.

U.S. Pat. No. 7,566,137 B2 discloses a combined electric light and window treatment controller based on either a single sensor or multiple sensors. The electric lights are grouped into zones with either the single sensor or the multiple sensors. In the case of multiple sensors, the output of these sensors is simply averaged. The multi-zone control is achieved through pre-programmed controllers present in each zone. The combined window treatment and electric light controller is based on a sequential operation: e.g., first the blinds are closed or opened, then the electric lights are adjusted.

While such patent disclosures demonstrate the natural progression from today's independent controls toward integrated closed loop controls, they are not without shortcomings.

One common shortcoming of the above systems is that they operate sequentially, e.g., first the blinds close/open fully, followed by the operation of the electric lights. Such a system has the potential to dissatisfy the users. For example, when users change the setpoints or an occupancy sensor detects a changing environment and settings need to be changed (such as from OFF to ON position), users will have to wait until the sequential operation is completed to see if the lighting preferences are met. Since window treatments operate slowly, the overall waiting time can be several seconds long, if not a minute or more. With today's need for fast responses, users may not tolerate such a long waiting time and will eventually revert to fully manual controls.

In the case of a non-uniform distribution of daylight, U.S. Pat. No. 7,566,137 proposes the use of pre-set values for electric lighting in each zone. Such a system is expensive, as it requires calibration during installation as well as continued maintenance when the building condition (interior or exterior) changes. This patent mentions a multisensory approach, but the main purpose is to increase the robustness by simple averaging of the output of these sensors. Such an averaging may work for uniform distribution light requirements, but not for controlled non-uniform distributions. In addition, such a system is not optimal in terms of energy savings.

Thus, the above systems do not support a multi-sensor strategy for an optimal reduced-energy lighting control.

This disclosure includes a framework for an adaptive integrated control of window treatments (e.g. blinds, shades, etc.) and electric lights to optimize the overall light distribution according to given requirements and reduce energy consumption. The proposed framework allows an integrated control of daylight (e.g., window blinds, shades, etc.) with electric lights, making use of multisensors and an integrated control system. The control system in one embodiment contains a central controller (joint control of daylight and electric light), and in another embodiment, contains individual controllers for electric lights and window treatments, respectively. The multisensors sample the lighting conditions in the space, and in certain embodiments the multisensors may be distributed. The integrated control system provides the optimum electric lighting and daylighting to meet lighting distribution requirements. In addition, certain embodiments of the framework are based on parallel operation of electric lights and motorized window treatments. Thus, the framework may advantageously reduce energy consumption and improve user visual comfort, and may not suffer from the shortcomings of sequential control strategies as discussed above.

Some representative features in various embodiments of the invention are as follows:

- A parallel-operation solution, i.e., both window treatments and electric lights operate substantially at the same time (not sequentially).
- The control system uses multi-sensors in an innovative way to control the lighting distribution in a space toward either uniform or non-uniform distribution.
- The control system monitors the lighting conditions through sensors to adjust the window treatments and electric lights.
- The control system does not require a single 'box' controller to implement the integrated solution. The window treatment controller and the electric light controller can simply exchange information, but these controllers can be embedded into the respective systems.
- The system controls the lighting conditions in such a way that users' lighting setpoints and reducing energy consumption goals are met via closed loop operations.
- Other sensors, such as occupancy sensors, can also be integrated into the system.
- Additional features, such as glare controls (using solar time-based and/or sensor based) can also be integrated into the system.

In one embodiment, the invention relates to a method of controlling light distribution in a space including multiple installed light sources and an external light source, the method includes: measuring the luminance levels of light from the multiple installed light sources and the external light source at a plurality of measuring areas within the space, controlling the intensity level of each of the installed light sources and the amount of light from the external light source entering the space based on the measured luminance levels, and tuning the intensity level of each of the installed light sources and the amount of external light entering the space simultaneously to optimize the conditions that the mean-squared error between the measured luminance levels and pre-defined target luminance levels for the respective plurality of measuring areas is minimized, and the amount of energy consumed by the multiple installed light sources is minimized.

In another embodiment, the invention relates to a system of controlling light distribution in a space including multiple installed light sources and an external light source, the system includes a plurality of sensors for measuring the luminance levels of light from the multiple installed light sources and the external light source at a plurality of measuring areas within the space, at least one controller for controlling the intensity level of each of the installed light sources and the amount of light from the external light source entering the space based on the measured luminance levels, wherein the at least one controller tunes the intensity level of each of the installed light sources and the amount of external light entering the space simultaneously to optimize the conditions that the mean-squared error between the measured luminance levels and pre-defined target luminance levels for the respective plurality of measuring areas is minimized, and the amount of energy consumed by the multiple installed light sources is minimized.

In another embodiment, the invention relates to non-transitory computer readable medium having stored thereon instructions for causing a processor to perform a process of controlling light distribution in a space including multiple installed light sources and an external light source, the process includes measuring the luminance levels of light from the multiple installed light sources and the external light source at a plurality of measuring areas within the space, controlling the intensity level of each of the installed light sources and the amount of light from the external light source entering the space based on the measured luminance levels, and tuning the intensity level of each of the installed light sources and the amount of external light entering the space simultaneously to optimize the conditions that the mean-squared error between the measured luminance levels and pre-defined target luminance levels for the respective plurality of measuring areas is minimized, and the amount of energy consumed by the multiple installed light sources is minimized.

In general, the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Certain embodiments herein describe a system and method for providing a uniform or controlled light distribution by integrating control of daylight and electric light from one or more lighting fixtures. The integrated control system may advantageously be based on minimizing the mean-squared error of the measured luminance at the sensor sampling points and minimizing an energy cost function.

In a space having multiple controlled light fixtures, the light fixtures could be in a single office (uniform lighting in a space) or task lights for non-uniform distribution (multiple offices such as cubicles or single offices with task lights).

Multiple sensors may be installed to sample the light levels in various locations throughout the space. An integrated closed-loop control algorithm then adjusts the light levels from each light fixture and controls window treatments in such a way that an overall desired light distribution and energy reduction is achieved.

Figure 1:
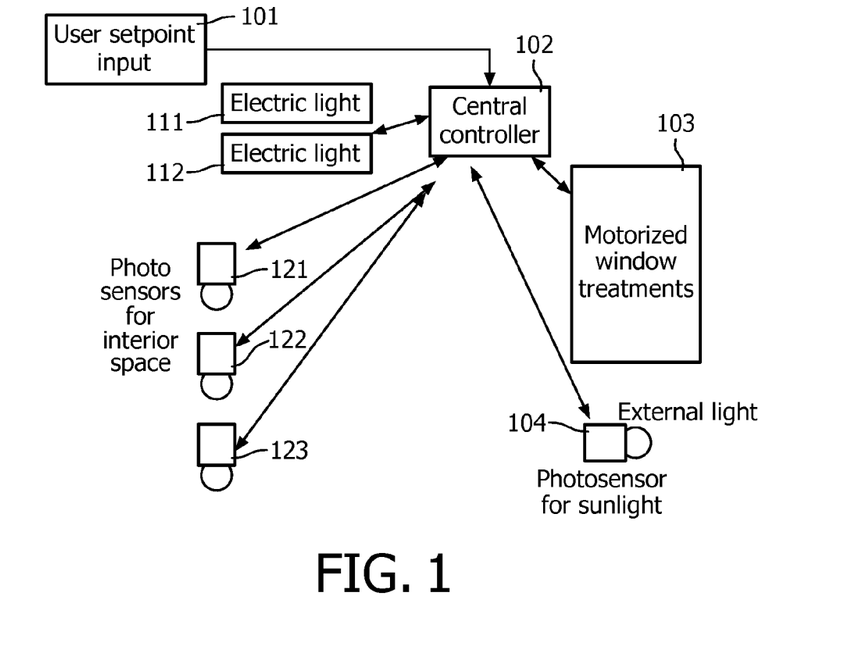
FIG. 1 shows a high level diagram of a lighting control system according to an embodiment of the invention.

FIG. 1 shows an embodiment of the implementation described herein. The system in FIG. 1 includes a central controller 102, which receives inputs from photo sensors 121, 122, 123 for a space and from a photo sensor 104 for external light (e.g., sunlight). User input 101 (User setpoint input) and sensor data from the sensors 104, 121, 122, 123 are processed by the central controller 102 to produce an appropriate operating condition, and accordingly the central controller 102 adjusts the intensity of electric lights 111, 112 and controls the window treatments 103 to modify the amount of external light entering into the space. Note that reference to "sunlight" does not limit the light exterior to the space as sunlight. Photo sensor for sunlight 104 may sense any light exterior to the space or specific to a source of light.

Figure 2:
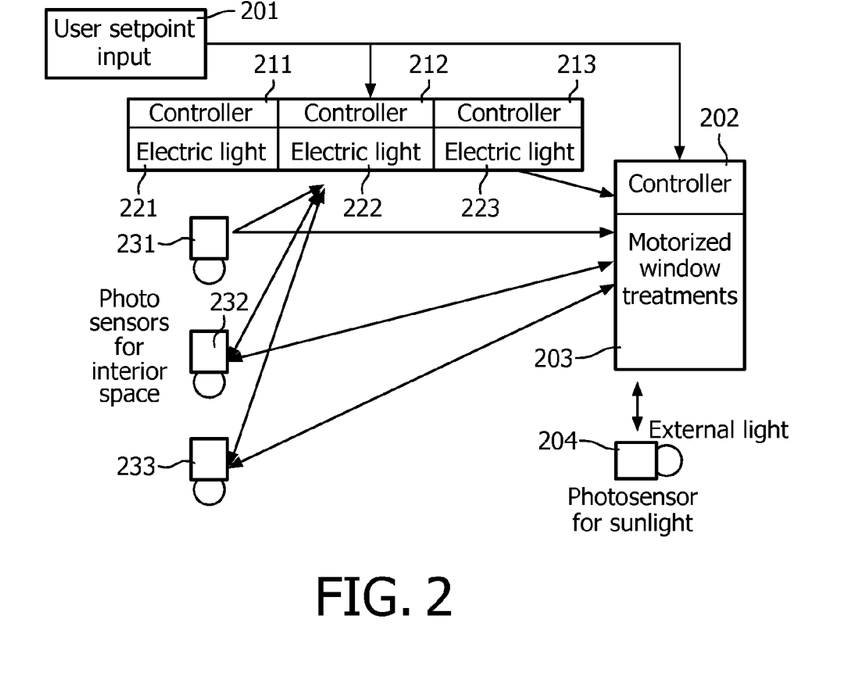
FIG. 2 shows a high level diagram of a lighting control system according to another embodiment of the invention.

FIG. 2 shows another embodiment of the present invention. The system includes multiple controllers: electric light controllers 211, 212, 213 for controlling the electric lights 221, 222, 223 respectively, and a window treatment controller 202 for controlling the motorized window treatments 203. Photo sensors for a space 231, 232, 233 and photo sensor for external light (e.g., sunlight) 204 measure light intensities at their respective locations. In this case, all sensor information and user requirements 201 are fed to each of the controllers. The controllers also share information among themselves. For example, an electric light controller sends the electric light intensity levels to the window treatment controller, and the window treatment controller informs the electric light controller the amount of external light available and the operation status of the window treatment (e.g., percentage of window blinds opening).

The embodiments shown in FIGS. 1 and 2 have their own advantages from technical, cost and business strategy points of view. The strategy can also incorporate additional features, such as occupancy sensors and glare control strategies.

Figure 3:
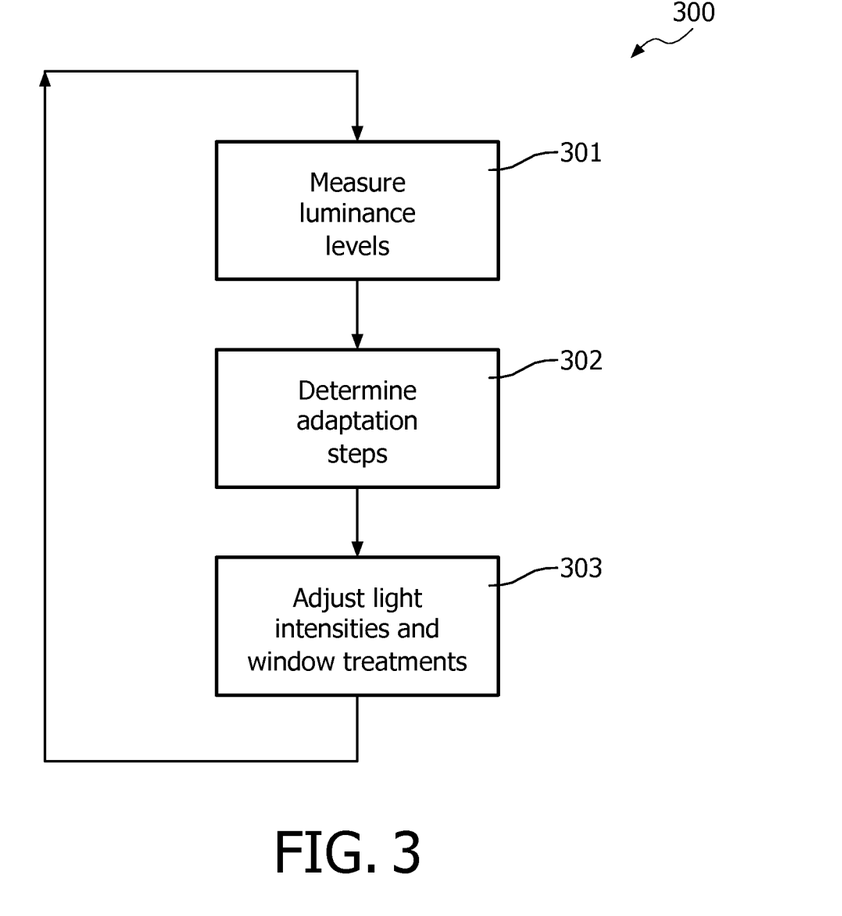
FIG. 3 shows a flow chart of a control system operation according to an embodiment of the invention.

FIG. 3 shows an iterative process 300 of controlling the electric lights and the window treatment in accordance with an embodiment described herein.

In 301, the luminance level of light from the light sources is measured by sensors at different measuring areas within the space, where the measuring area can be a point-like measuring area (e.g., at 20 difference places at the ceiling of the space) or a non-point like measuring area. The aim of measuring the light from the light sources at the multiple measuring areas is to obtain the light distribution within the space. Assuming the number of measuring areas is k and N is the number of installed light sources, the measured luminance level at each area, $\vec{y}(n)=[y_1, \ldots, y_k]^T$ is assumed to have contributions from N installed internal light sources at the k areas, with light levels $\vec{x}(n)=[x_1, \ldots, x_k]^T$ and from external light luminance levels at the k areas, $\vec{dl}(n)=[dl_1, \ldots, dl_k]^T$, where n is a time indicator.

As an example, $y_6$ is the measured luminance level at measuring area 6 and $dl_6$ is the contribution to the measured luminance level due to the external light source (e.g., sunlight entering from a window), and $x_2$ is the actual light level at light source 2.

In 302, the adaptation steps for adjusting the intensities of the light fixture and the external light source are determined. An exemplary embodiment provides a strategy of the controller which is based on minimizing the mean-squared error of the measured luminance at the sensor sampling points and minimizing an energy cost function. Assuming N light fixtures, with light levels $x=\{x_1, x_2, \ldots, x_N\}$, the luminance level of daylight at the window is d(n), and the transfer function of external light to k sample points as $dl=\{dl_1, dl_2, \ldots, dl_k\}$, then the luminance level at the k sample points (where the sensors are located) can be described by $$y(n)=x(n)A+dld(n)w(n) \qquad \text{Eq. (1)}$$

where A is N×k matrix describing the relationship between the electric lights and the sample points (sensors) and w(n) is the window treatment external light transmission factor (e.g., related to window blind tilt angle). Note that d(n) is measured by the external photo sensor. The error between the measured luminance and the desired light levels at the sample points can be described by $$e=y-u \qquad \text{Eq. (2)}$$

where u is the desired set points at the sample points. For uniform light distribution this value will just be a single value.

In the present embodiment the adaptive light controller is configured for minimizing the mean squared error and power consumption. One way to accomplish this is through a closed-loop system described by the following system of equations:

$$x(n) = x(n-1) - \mu_1 \frac{\partial \|e(n)\|^2}{\partial x} \qquad \text{Eq. (3)}$$

$$w(n) = w(n-1) - \mu_3 \frac{\partial \|e(n)\|^2}{\partial w} - \mu_4 \frac{\partial \|P(n)\|^2}{\partial w}$$

where μ's are adaptation step sizes and P(n) is the total power consumption. Here, the lighting system is adapted toward minimization of the mean squared error of lighting, whereas the window transmission is adapted toward minimizing the overall power consumption and mean squared error of lighting. In the case of multiple window transmission units, one can form a similar construction where w(n) will be a vector. In the following, and without the loss of generality, a single window transmission unit is assumed for ease of explanation.

The power consumption can be approximated with the sum of the dimming levels of individual fixtures, i.e., $$P(n) \propto \sum_{i=1}^{N} x_i(n) \qquad \text{Eq. (4)}$$

This is not an exact relationship due to non-linearity of dimming level versus power. However, this is a good approximation for the purpose of controls.

Thus, $$\frac{\partial \|P(n)\|^2}{\partial w} \propto \sum_{i=1}^{N} x_i(n) \frac{\partial x_i(n)}{\partial w} \qquad \text{Eq. (5)}$$

It is not trivial to find the exact representation of $$\frac{\partial x_i(n)}{\partial w}.$$

However, for an exemplary embodiment of the adaptive control strategy, an approximation having a constant factor will be used. This approximation is based on the relationship of Eq. (1), i.e., $x(n)A=y(n)-dld(n)w(n)$. This implies $$\frac{\partial x_i(n)}{\partial w} = -c_i * d(n),$$

where $c_i$ is a constant. This constant factor depends on the external light distribution relative to the electric light fixtures. Finding an exact value for the factors is not trivial. For all practical purposes, one embodiment assumes that all of them are identical and that this constant factor will be merged with the adaptation step size and calibrated for optimal operation during installation.

The use of these approximations and further simplification of the above equations results in the following system of adaptive equations describing the control strategy:

$$x(n) = x(n-1) - \mu_1 A e(n) \qquad \text{Eq. (6)}$$

$$w(n) = w(n-1) - \mu_3 e(n) dl^T d(n) + \mu_4 d(n) \sum_{i=1}^{N} c_i x_i(n)$$

A further simplification could still be performed if one notes that the effect of d(n) in the above equations is to speed up or slow down the adaptation based on the amount of external light. A further embodiment may ignore the effect of this, thereby simplifying the adaptation of the window transmission into the following equation (and using the simplification that all $c_i$'s are equal)

$$w(n) = w(n-1) - \mu_3 e(n) dl^T d(n) + \mu_4 \sum_{i=1}^{N} x_i(n) \qquad \text{Eq. (7)}$$

In 303, the intensities of the light fixture and the external light entering through the window are adjusted. The value of n is incremented and the iteration loop 300 continues until a steady state is reached.

Figure 4:
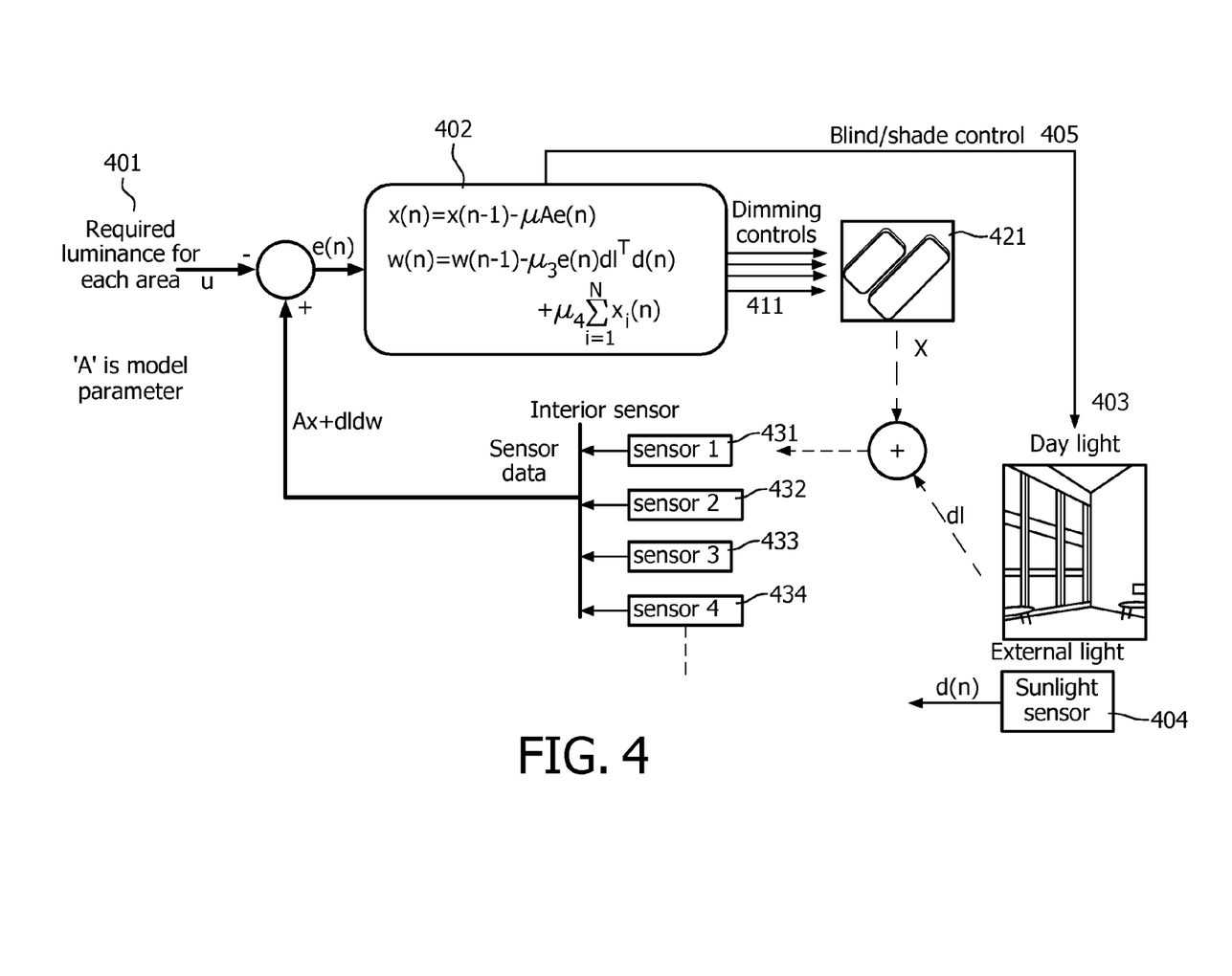
FIG. 4 shows a high level diagram of an implementation of an adaptive controller according to an embodiment of the invention.
Figure 5:
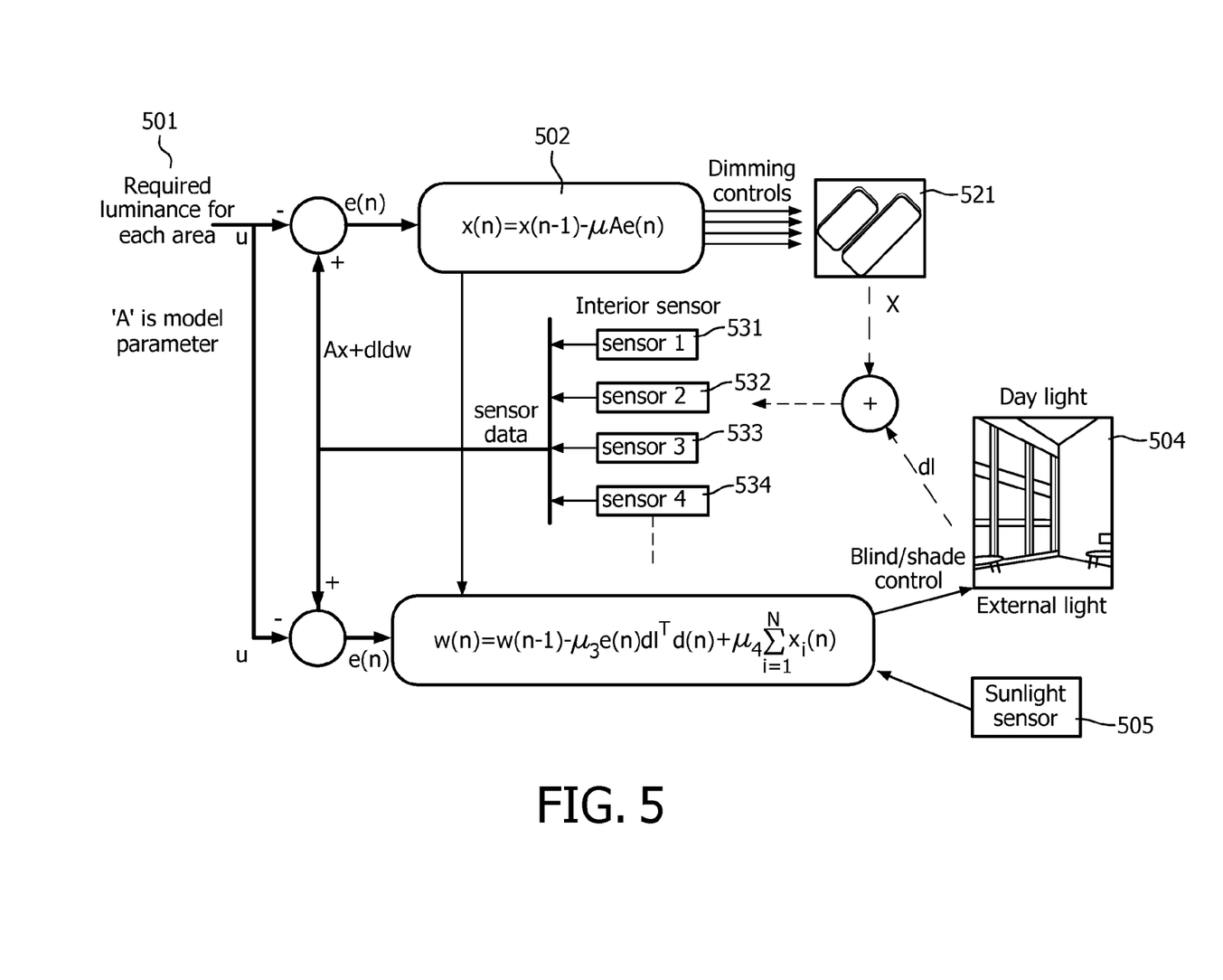
FIG. 5 shows a high level diagram of an implementation of an adaptive controller according to another embodiment of the invention.

FIGS. 4 and 5 show the block diagrams of the above control strategy using two example implementations of the present invention.

As shown in FIG. 4, the central controller 402 controls both the electric lights 421 and the window treatments 403. The required luminance level for each area 401 together with the measurements from the interior sensors 431-434, and the external light sensor 404 are fed to the central controller 402. The central controller 402, using the adaptation procedures as described above, produces the appropriate dimming controls 411 to control the electric light intensities, and the window treatment control 405 to adjust the amount of external light (e.g., day light) entering the space through the window.

In FIG. 5, the electric light controller 502 controls the electric lights 521, and controller 503 controls the window treatments 504. The required luminance level for each area 501 together with the measurements from the interior sensors 531-534, and the external light sensor 505 are input to the electric light controller 502 and the window treatments controller 503. The controllers 502 and 503 exchange sensor data and their operation states. The electric light controller 502 and the window treatment controller 503, using the adaptation procedures as described above, control the electric light intensities and the amount of external light entering the space, respectively.

Simulated Performance Evaluation (Example)

Figure 6:
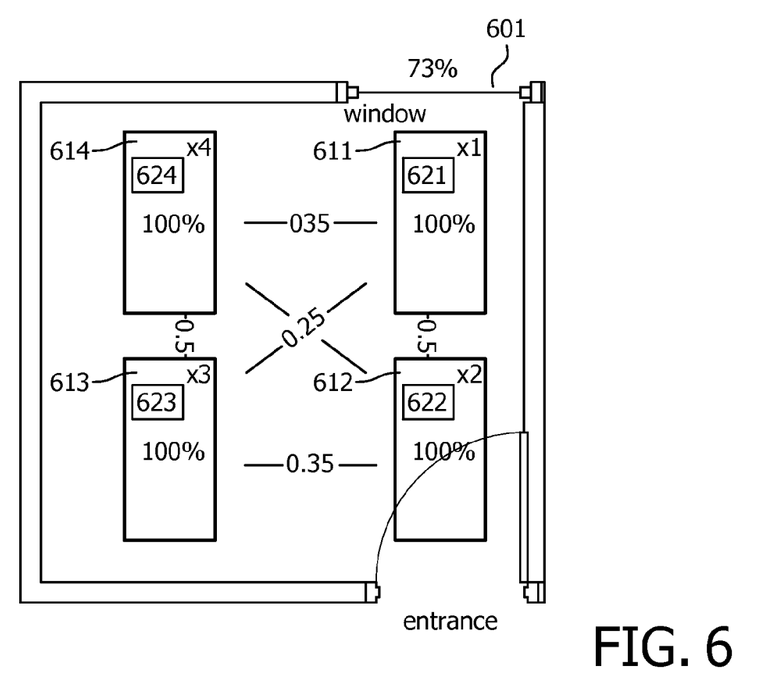
FIG. 6 shows a reference approach with multisensory and motorized window treatment control in a space.
Figure 7:
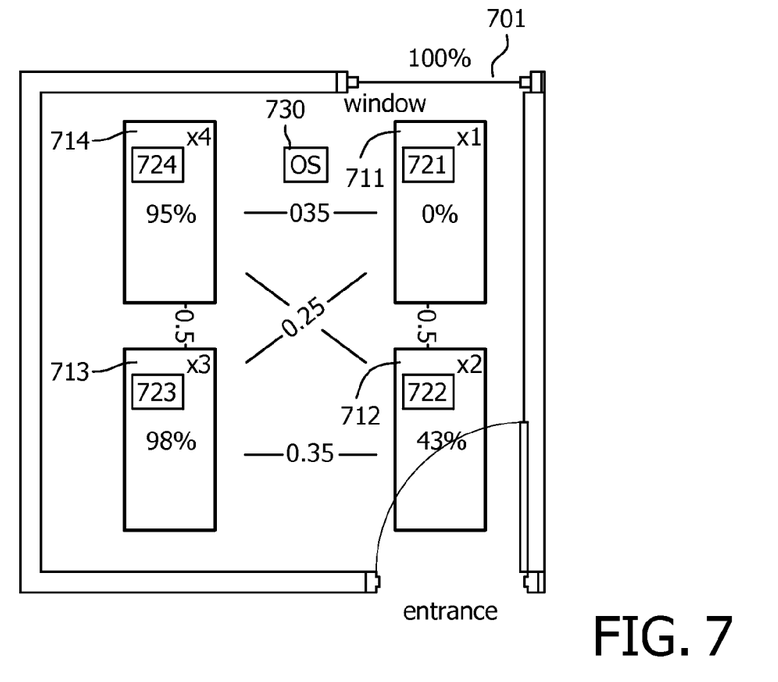
FIG. 7 shows an approach with multisensory and motorized window treatment control in a space according to an embodiment of the invention.

As an illustrative example, a rectangular single-person office is considered. The floor-view of this office is shown in FIGS. 6 and 7. FIG. 6 shows one approach of controlling light distribution, and it serves as a reference technology for comparing system performance against one implementation of the disclosed control strategy shown in FIG. 7. In the present example, there are four light fixtures 611-614 or 711-714, and the office has one window 601 or 701. As an example, motorized window blinds are used for adjusting the amount of external light entering the office through the window 601 or 701. In this example embodiment, four sensors 621-624 or 721-724 are deployed, one under each of the light fixtures. Note that the number of sensors does not need to be the same as the number of light fixtures, and the sensors do not need to be under each of the light fixtures.

The numbers (1, 0.5, 0.35, 0.25) describe the basis for the relationship matrix, i.e.

$$A = \begin{bmatrix} 1.0 & 0.5 & 0.25 & 0.35 \\ 0.5 & 1.0 & 0.35 & 0.25 \\ 0.25 & 0.35 & 1.0 & 0.5 \\ 0.35 & 0.25 & 0.50 & 1.0 \end{bmatrix}$$

The distribution of the normalized natural light at the sample points is assumed as dl={1.5, 1.0, 0.5, 0.5} and the normalized desired luminance level as u={2.1, 2.1,2.1,2.1}. The maximum light from each light fixture is normalized to 1.

The reference technology as shown in FIG. 6 assumes multiple sensors, but each light and the window blinds are adapting independently. The percentage numbers in FIGS. 6 and 7 show the steady-state results of the simulated control systems. At the start of simulation, all lights were turned off and the window blinds were closed. As shown FIG. 6, the current modern technology would not take full advantage of the available external light, as all electric lights were 100% ON and the blinds are not fully open (only 73%). In FIG. 7, for a system in accordance with one embodiment of the present invention, the light fixture 711 next to the window 701 is turned off, the light fixture 712 next to the door is dimmed to 43%. The other fixtures 713 and 714 that are in the dark areas of the room are turned ON to almost full capacity (98% and 95% respectively). This steady-state result exhibits about 42% reduction in lighting power compared to the system of FIG. 6. In addition, it provided more external light (e.g., sunlight) that potentially results in more occupant comfort. An optional occupancy sensor (OS) 730 may be included so that the luminosity can be reduced when the presence of a person is not detected.

Figure 8:
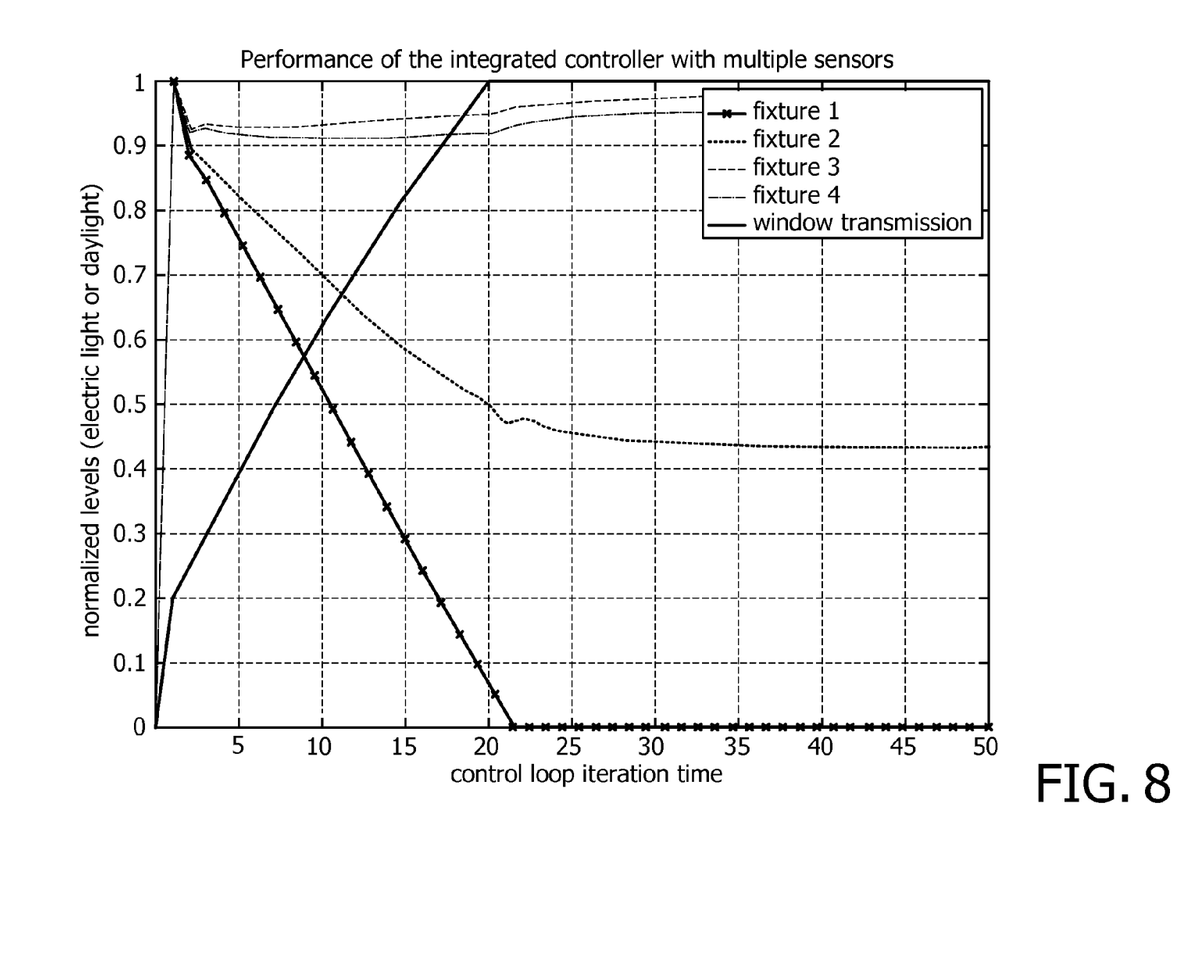
FIG. 8 shows the performance of one embodiment of adaptive algorithm as a function of time.

FIG. 8 shows the performance of the control system as a function of time for each light fixtures and window transmission for the above example of FIG. 7. Initially, the lights were turned OFF and blinds closed fully.

As the adaptive algorithm was applied, the individual controlled units moved into the optimal steady-state value and the window blinds opened fully.

Figure 9:
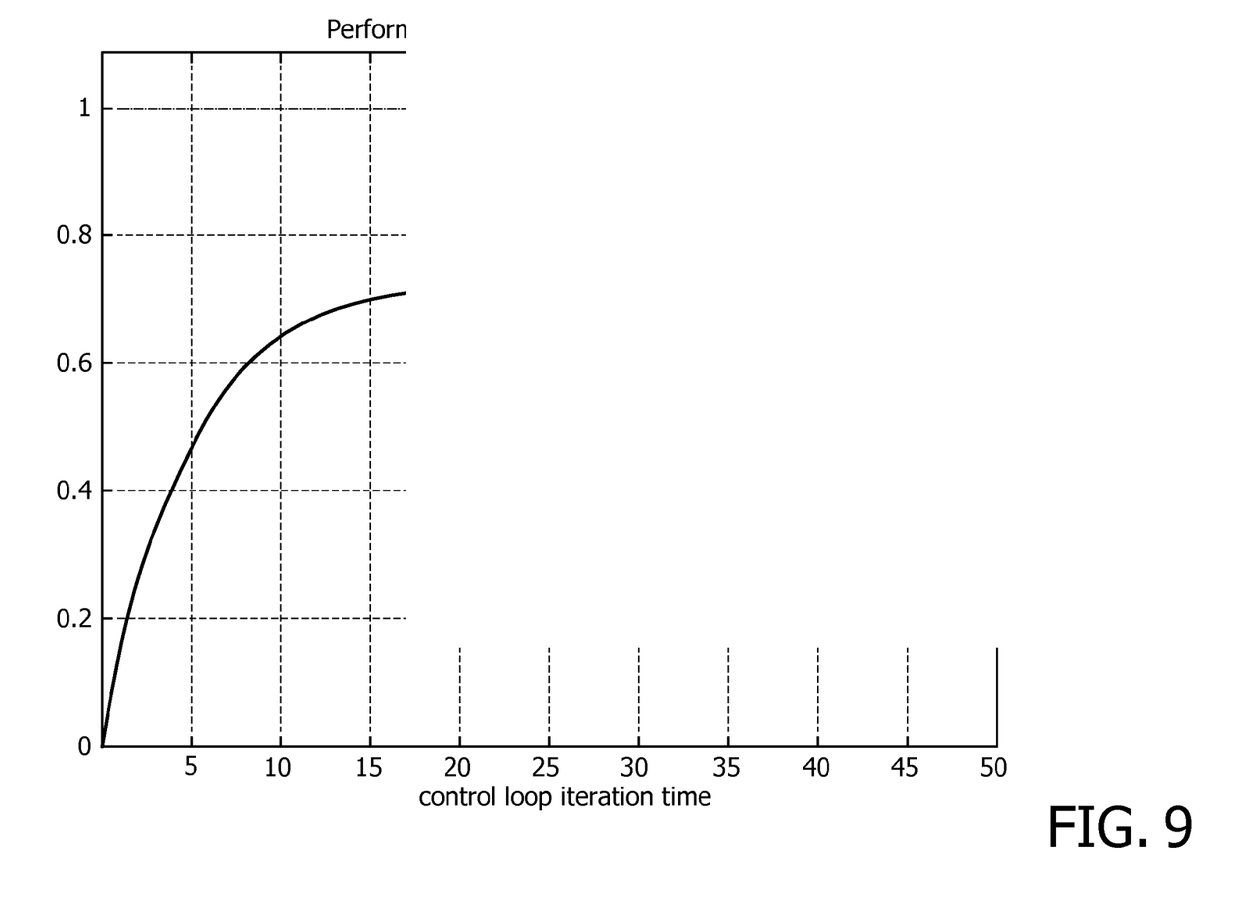
FIG. 9 shows the performance of a reference system.

FIG. 9 shows the corresponding result for the system shown in FIG. 6. As mentioned above, this system is not optimal both in terms of user comfort as well as energy savings.

This disclosure is applicable to lighting controls and energy management in buildings and homes.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this disclosure.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method of controlling light distribution in a space including multiple installed light sources and an external light source, comprising:
   measuring luminance levels of light from the multiple installed light sources and the external light source at a plurality of measuring areas within the space;
   controlling an intensity level of each of the installed light sources and an amount of light from the external light source entering the space based on the measured luminance levels; and
   tuning the intensity level of each of the installed light sources and the amount of external light entering the space simultaneously to optimize the conditions such that a mean-squared error between the measured luminance levels and pre-defined target luminance levels for the respective plurality of measuring areas is minimized, and the amount of energy consumed by the multiple installed light sources is minimized.

2. The method according to claim 1, wherein the intensity level of each of the installed light sources and the amount of external light entering the space are controlled by a central controller.

3. The method according to claim 1, wherein the intensity level of each of the installed light sources is controlled by an electric light controller and the amount of external light entering the space is controlled by a window treatment controller.

4. The method according to claim 1, wherein the tuning is performed by iteratively adjusting the intensity of each of the multiple installed light sources by a first adaptation step size and the amount of external light entering the space by a second adaptation step size, wherein the first and second adaptation step sizes depend on a difference between the pre-defined target luminance level and the measured luminance level, and on the energy consumption.

5. The method according to claim 1, further comprising detecting presence of a person within a given area of said space, and adjusting the target illumination level based on the detection.

6. A system of controlling light distribution in a space including multiple installed light sources and an external light source, the system comprising:
   a plurality of sensors measuring luminance levels of light from the multiple installed light sources and the external light source at a plurality of measuring areas within the space; and
   one or more controllers for controlling an intensity level of each of the installed light sources and an amount of light from the external light source entering the space based on the measured luminance levels,
wherein the at least one controller tunes the intensity level of each of the installed light sources and the amount of external light entering the space simultaneously to optimize the conditions such that a mean-squared error between the measured luminance levels and pre-defined target luminance levels for the respective plurality of measuring areas is minimized, and the amount of energy consumed by the multiple installed light sources is minimized.

7. The system according to claim 6, wherein the intensity level of each of the installed light sources and the amount of external light entering the space are controlled by a central controller.

8. The system according to claim 6, wherein the intensity level of each of the installed light sources is controlled by an electric light controller and the amount of external light entering the space is controlled by a window treatment controller.

9. The system according to claim 6, wherein the one or more controller iteratively adjusts the intensity of each of the multiple installed light source by a first adaptation step size and the amount of external light entering the space by a second adaptation step size, wherein the first and second adaptation step sizes depend on a difference between the pre-defined target luminance level and the measured luminance level, and on the energy consumption.

10. The system according to claim 6, further comprising an occupancy sensor for detecting presence of a person within a given area of the space, and wherein the target illumination level is adjusted based on the detection.

11. A non-transitory computer readable medium having stored thereon instructions for causing a processor to perform a process of controlling light distribution in a space including multiple installed light sources and an external light source, the process comprising:
   measuring luminance levels of light from the multiple installed light sources and the external light source at a plurality of measuring areas within the space;
   controlling an intensity level of each of the installed light sources and an amount of light from the external light source entering the space based on the measured luminance levels, and
   tuning the intensity level of each of the installed light sources and the amount of external light entering the space simultaneously to optimize the conditions such that a mean-squared error between the measured luminance levels and pre-defined target luminance levels for the respective plurality of measuring areas is minimized, and an amount of energy consumed by the multiple installed light sources is minimized.

* * * * *